Nov. 24, 1970 J. C. McKECHNIE 3,541,850

MOVING CABLE TENSION MEASURING DEVICE

Filed Aug. 21, 1968 3 Sheets-Sheet 1

John C. McKechnie
INVENTOR.

BY
Attorney

John C. McKechnie
INVENTOR.

BY

Attorney

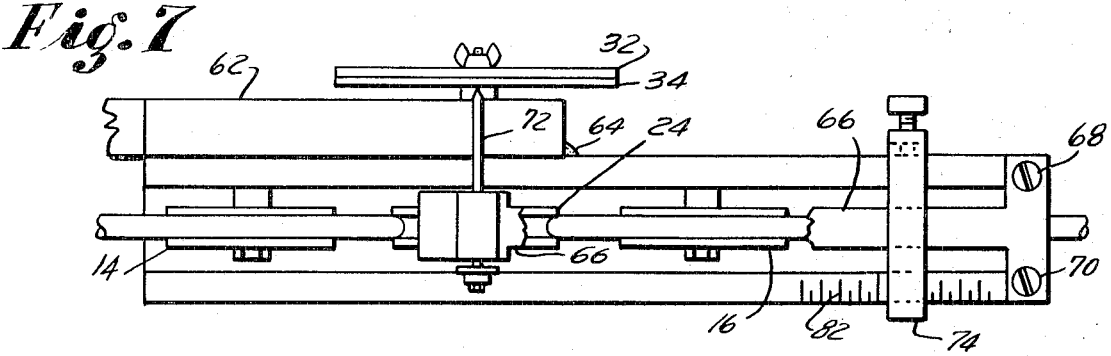
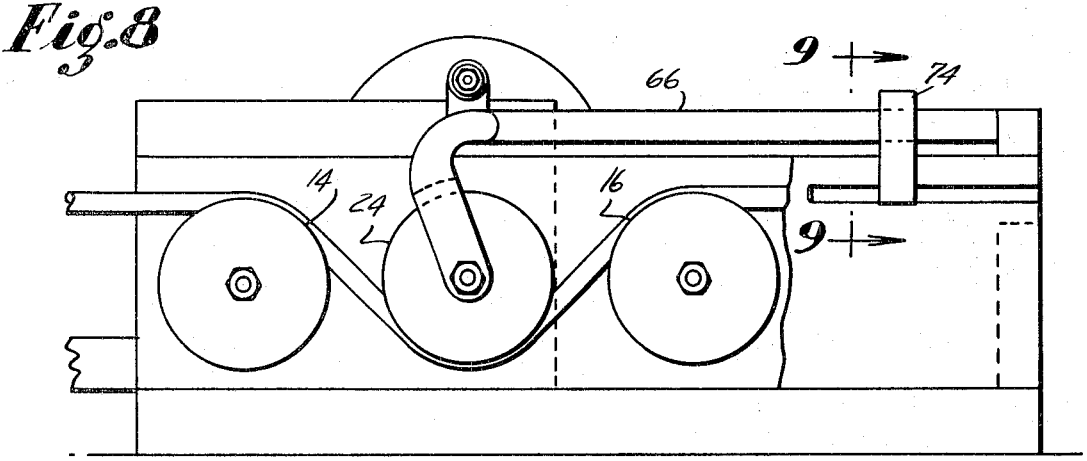
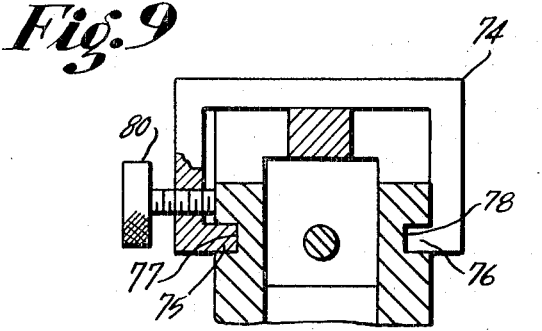
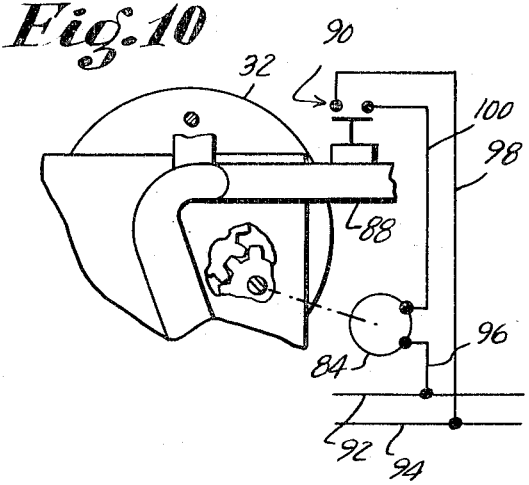

United States Patent Office 3,541,850
Patented Nov. 24, 1970

---

3,541,850
MOVING CABLE TENSION MEASURING DEVICE
John C. McKechnie, Maitland, Fla., assignor to the United States of America as represented by the Secretary of the Navy
Filed Aug. 21, 1968, Ser. No. 754,420
Int. Cl. G01l 5/06
U.S. Cl. 73—144                                1 Claim

ABSTRACT OF THE DISCLOSURE

This invention relates to a device for measuring progressively and continuously an increase in tension applied to a moving cable in arresting the movement of a vehicle. The device is particularly useful for measuring progressively the increase in tension applied to an elastic arresting cable used to arrest the movement of a plane on a carrier deck by continuous measurement and recording, through spring means and a recording disc and scribe, of deflection force in the cable as the cable stretches and the plane is brought to a halt.

BACKGROUND OF THE INVENTION

This invention relates to the field of tension measuring devices and more particularly to the field of force arresting devices employing stretchable cables wherein the rate of arrest of movement and the peak force during arrest are factors of significant importance. One such application is in the use of arresting cables for landing carrier based planes. In this area because of the continuous change in weight of planes, change in normal landing speeds and in landing speed variation due to pilot flying characteristics, there is a continuous need for day-to-day data to determine exactly what is happening on each landing and what G force is being placed on the pilot and equipment.

When a new aircraft is introduced into the fleet, tensions characteristic data is obtained from rather elaborate test site electronic equipment which reflects also the flying characteristics of selected test pilots. Since shipboard installation cannot reasonably be modified to utilize elaborate test site equipment, much valuable data is lost which could otherwise be obtained from day-to-day operation in the fleet. Such day-to-day data would also be useful in training pilots for proper landing procedures and speed, especially where an immediate record of the tension forces developed in a landing were available immediately to the pilot and instructors.

To date no satisfactory device of low bulk and weight has been developed to solve this problem. In accordance with this invention a device of small weight and bulk is provided for attachment to the arresting cables on a carrier for continuously measuring and recording data on cable tensions developed in each landing. The device is also applicable to continuous recording of tensions in cables securing a large ship to a dock or pier.

SUMMARY OF THE INVENTION

The invention in general comprises the association of three block mounted non-aligned rollers through which a cable is guided, one of the rollers being spring biased for deflection of a portion of the cable, together with a rotatable disc having a scribe surface, drive means for rotating the disc responsive to the application of load to the cable and scribe means relatively moveable in relation to the axis of the rotatable disc in degree commensurate with the tension applied to the cable.

DESCRIPTION OF THE DRAWING

FIG. 5 is an elevational view partly in cross section taken on line 5—5 of FIG. 2;

FIG. 7 is a plan view of a device incorporating a modified form of the invention;

FIG. 8 is an elevational view of the device of FIG. 7;

FIG. 9 is a sectional view taken on line 9—9 of FIG. 8;

FIG. 10 is a schematic view showing a further modification of the invention; and FIGS. 11 and 12 illustrate scribe recordings on the scribe surface of rotatable discs forming part of the devices illustrated in FIGS. 1 through 10.

DESCRIPTION OF THE PREFERRED EMBODIMENT

Figure 1:
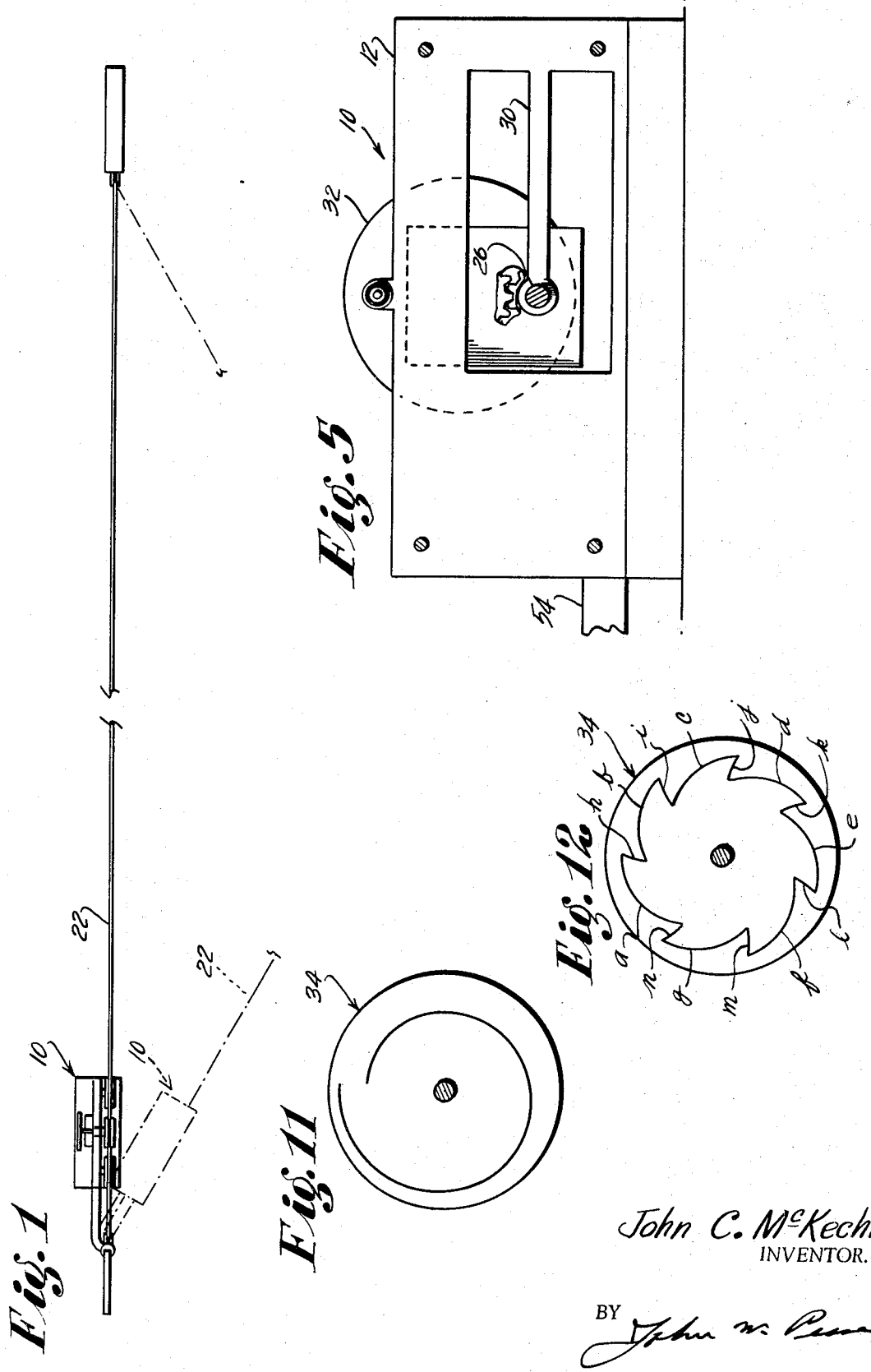
FIG. 1 is a schematic view of a tension measuring device incorporating the invention as shown attached to an elastic cable in which tension is to be measured.
Figure 2:
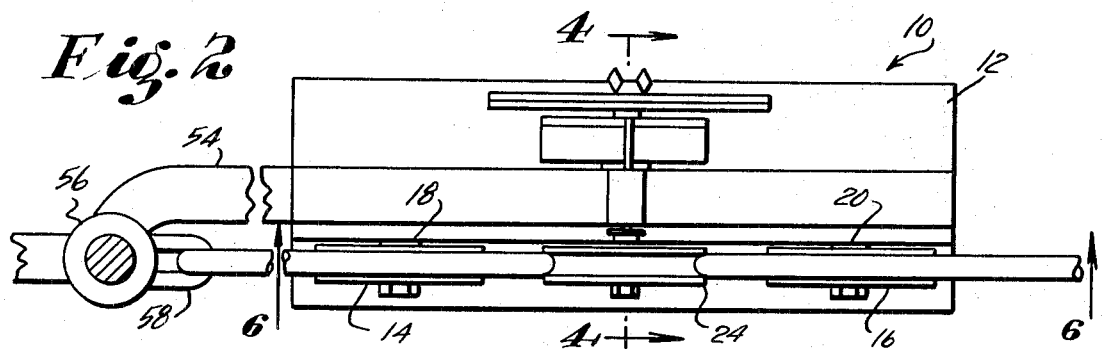
FIG. 2 is an enlarged plan view of the device of FIG. 1 showing details of the pivot anchor arrangement of the device.
Figure 3:
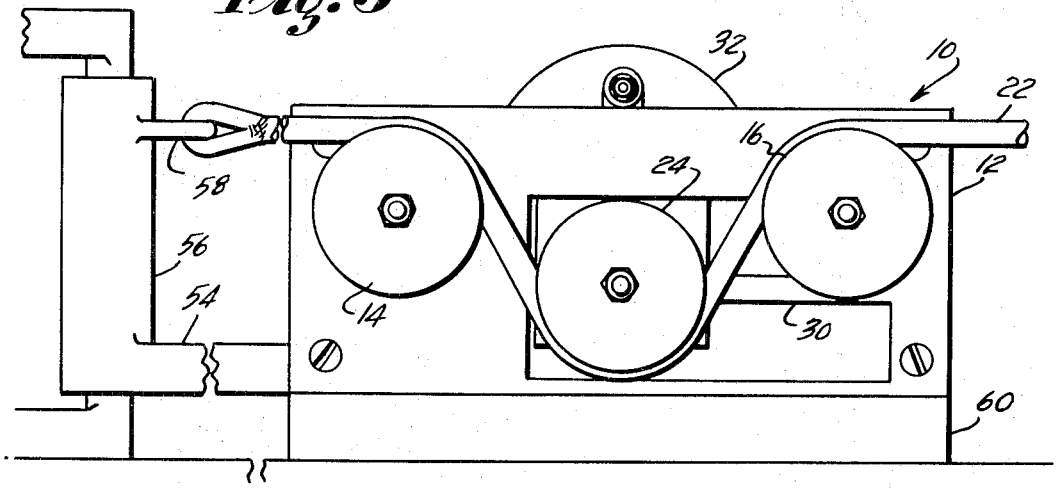
FIG. 3 is a side elevational view of the device of FIG. 1.

Referring to the drawing, FIGS. 1 through 5 illustrate a device 10 incorporating the invention. Device 10 comprises a support 12, a pair of guide rollers 14 and 16 mounted in spaced fixed position on said support by respective idler shafts 18 and 20 for engaging one side of an elastic tension cable 22. To deflect a portion of the cable 22 downward to measure tension in the cable by means of deflection force, I provide a deflection roller 24 engageable with the opposite side of said cable 22 intermediate the guide rollers 14 and 16. Roller 24 is supported on a drive shaft 26 (FIGS. 4 and 5) journalled in a bearing 28 fixed in the free end of a cantilever spring 30, the other end of which is integral with the support 12. Spring 30 thus provides a downward bias on the deflection roller 24 progressively increasing downward force on the pulley 24 as the pulley is forced upward under increasing load tension in cable 22.

Figure 4:
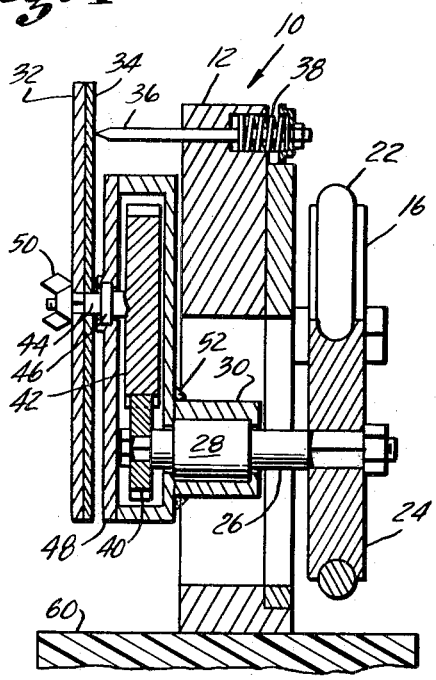
FIG. 4 is a cross sectional view taken on line 4—4 of FIG. 2.

In order to continuously record the deflection in cable 22 and thus provide a continuous indication of load conditions in cable 22, I provide a rotatable disc 32 (FIG. 4) having a scribe surface or plate 34 engageable by a scribe 36 spring biased as by spring 38 to engage the scribe surface 34 together with drive means for rotating disc 32 responsive to the application of load to cable 22. Thus, as shown in FIG. 4, I provide a reduction gear drive connecting the disc 32 to the deflection roller 24 via the drive shaft 26 and a gear train including a drive gear 40 fixed to the shaft 26, a driven gear 42 and a rotor shaft 44 connecting gear 42 to disc 32. Shaft 44 is journalled by a bearing 46 supported in a housing 48 of the gear drive. Disc 32 is secured to the shaft 44 by a nut 50 or other suitable means and housing 48 is welded as at 52 or otherwise fixed to the free end of spring 30 to prevent rotation of the housing 48.

In application of the above described device to a plane arresting cable the device (see FIGS. 2 and 3) is provided with an arm 54 having a hinge portion 56, the arm being made integral with the support 12 and the hinge being provided with an eyelet 58 for securing one end of the cable 22. A slide shoe 60 or other suitable means is provided for sliding of the device 10 on the deck of a carrier.

In operation the cable 22 and device 10 are set up as shown in FIG. 1. Upon application of arresting force to a plane (not shown), the cable 22 is stretched and moved to the dotted line position shown and device 10 moves with the cable from the full line position to the dotted line position shown. As cable 22 stretches, roller 24 is rotated and moved upward. Rotation of roller 24 rotates disc 32 and causes the scribe to mark the scribe surface as indicated in FIG. 11 to indicate the deflection change in cable 22 and hence the tension in the cable. It is to be understood that the gear ratio is chosen in relation to the linear movement of the cable under the range of load conditions and the desired length of scribe on the rotating disc scribe surface.

Figure 6:
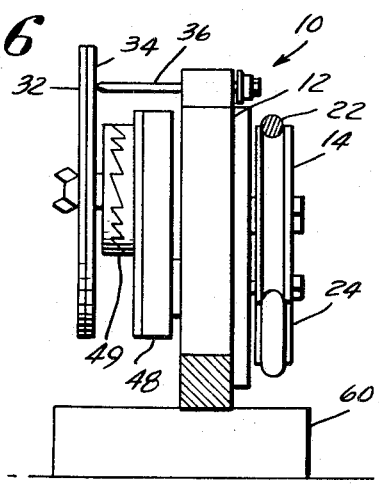
FIG. 6 is an end elevational view of a device identical to the device of FIGS. 1–5 except for the addition of a one-way clutch.

FIG. 6 indicates the same arrangement of device except that in the gear box 48 is connected to the disc 32 through a one-way clutch 49 and a reduced gear ratio is employed such that rotation of roller 24, in the interim of zero to full load on cable 22, causes only partial rotation of the disc 32. This produces a scribe of the type shown in FIG. 12 wherein lines *a–g* represent successive deflection readings for cable load buildup in several successive plane arrests and lines *h–n* represent the deflection changes for unloading after each arrest. This modified device serves the purpose of placing on the scribe disc the deflection readings for several successive plane arrests for a one picture comparison of results.

Referring now to FIGS. 7 through 9, there is shown a modification of the invention in which drive for the disc is obtained from the roller 14 through a gear drive indicated at 62. The gear drive 62 in this case does not move but is fixed to the support 12 by welding 64 or other suitable means. Deflection force is applied through a cantilever spring 66 fixed at one end to the support 12 by fasteners 68–70 or other suitable means and carrying the deflection roller 24 at its other end. Mounted on the free end of spring 66 is a spring biased scribe 72 for engaging the scribe surface 34 of scribe disc 32. Relative movement between the scribe 72 and disc surface 34 is thus provided by movement of the scribe with the deflection force spring 66. In this embodiment an adjustably slidable channel shaped stop member 74 having slide rails 75 and 76 is slidably positioned in channels 76 and 78 formed in the support 12 and locked in adjusted position by a lock screw 80 or other suitable means. A scale 82 marked on the support 12 provides an indicator for the adjusted position of the stop 74. By this arrangement the effective length of the spring 66 and hence its load characteristics can be varied to suit the prevailing load range placed upon the cable 22.

In a further modification of the invention, as shown in FIG. 10, it is also feasible to drive the disc 32 from a timer motor through a gear train 86, the motor being actuated by bending of a cantilever spring 88 under load conditions and actuation of a starter switch 90 to supply the motor with electric power from the supply lines indicated at 92 and 94 through leads 96, 98, and 100 shown.

Advantages of the devices described reside in the simplicity and small size of the device, the fact that it can be quickly attached and used in the field under actual carrier operation conditions to gather test data otherwise lost, and in the provision of an immediate recorded record of instantaneous and continuous cable tension values.

The invention described herein may be manufactured and used by or for the Government of the United States of America for governmental purposes without the payment of any royalties thereon or therefor.

It will be understood that various changes in the details, materials, and arrangement of parts, which have been described and illustrated in order to explain the nature of the invention, may be made by those skilled in the art within the principle and scope of the invention as expressed in the appended claims.

It is claimed:
1. A tension measuring device for attachment to an elastic arresting cable anchored at opposite ends to continuously record the force applied to the cable in arresting the movement of a vehicle comprising:
   (a) an elastic arresting cable;
   (b) a support;
   (c) a pair of guide rollers;
   (d) means mounting said guide rollers in spaced fixed position on said support for engaging one side of said cable at spaced points;
   (e) a deflection roller;
   (f) means mounting said deflection roller to said support for substantially vertical movement to engage the other side of said cable intermediate said guide rollers and apply a variable deflection force to said cable;
   (g) a rotatable disc having a scribe surface;
   (h) drive means for rotating said disc responsive to the application of load to said cable;
   (i) scribe means supported from said base and engageable with said scribe surface to continuously record the deflection force on said cable as said cable is placed under variable load conditions;
   (j) said deflection roller mounting means including a cantilever spring having one end fixed to said support and its other end supporting said deflection roller; and
   (k) said drive means including a switch actuated responsive to movement of said cantilever spring, and a timer drive actuated responsive to the actuation of said switch.

References Cited
UNITED STATES PATENTS

| | | | |
|---|---|---|---|
| 1,987,815 | 1/1935 | Bartol | 73—144 |
| 2,685,493 | 8/1954 | McDonald et al. | 346—124 |
| 2,743,607 | 5/1956 | Decker | 73—144 |
| 2,932,967 | 4/1960 | Prewitt et al. | 73—88 |
| 3,182,495 | 5/1965 | Johnson | 73—141 |
| 3,358,502 | 12/1967 | Johnson | 73—141 |
| 3,430,250 | 2/1969 | Prewitt et al. | 346—7 |
| 3,066,778 | 12/1962 | Maurer | 192—45.1 |

RICHARD C. QUEISSER, Primary Examiner

J. WHALEN, Assistant Examiner